Nov. 14, 1944.　　　C. H. MAGURN　　　2,362,574
METHOD OF COATING SHOE SURFACES
Filed June 27, 1941
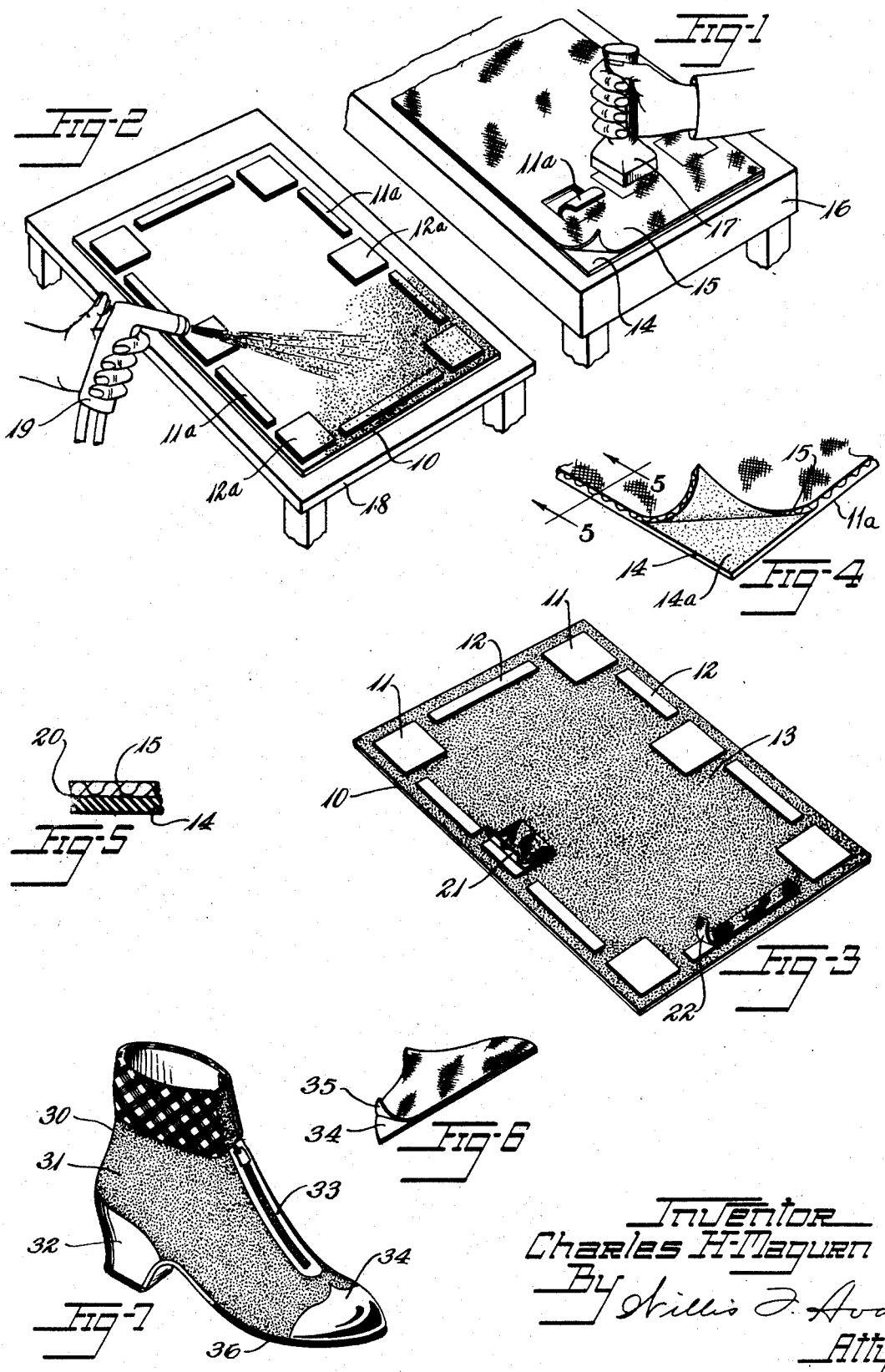

Patented Nov. 14, 1944

2,362,574

UNITED STATES PATENT OFFICE 2,362,574

METHOD OF COATING SHOE SURFACES

Charles H. Magurn, Arlington, Mass., assignor to The B. F. Goodrich Company, New York, N. Y., a corporation of New York Application June 27, 1941, Serial No. 400,013

2 Claims. (Cl. 12—142)

This invention relates to the coating of surfaces and especially to the coating of articles comprising natural rubber or other rubber-like material, such for example as rubber footwear, wherein it is desired for the purpose of ornamentation or reinforcement, or both, to provide a coated surface adjacent to a sharply-defined uncoated portion.

In the case of rubber footwear, for example, it is frequently desired to provide rubber toe tips, heel pieces and lacing stay portions and other areas with a reinforcement of rubber in contrast to the adjacent areas, which adjacent areas are coated as by spraying, dipping or otherwise applying a rubber cement, a lacquer, or an aqueous or other liquid dispersion of rubber or other substance.

The application of a mask to an area upon the shoe to shield such area from adjacent areas during spraying or other coating operations has required time-consuming care to effect the desired edge relationship and has not always produced the desired accuracy in defining the edge of the uncoated part. Frequently the application of the mask has been improperly done so that an undesirable overlapping of the adjacent coated and uncoated areas has resulted.

The invention is useful for example in making overshoes with rubber surface reinforcements adjacent to a main surface of a suede-like appearance which may be provided by an aqueous dispersion of coating material sprayed upon such surface. The invention is useful especially where it is desired that the uncoated sections have a bright appearance simulating patent leather in contrast to a suede-like appearance of the adjacent areas. The invention, however, is not restricted in application to the manufacture of rubber footwear but has utility in the manufacture of other articles as well, including mats, panels and other articles where sharply contrasting appearance is desired.

The chief objects of the invention are to provide uniform accuracy in the masking of parts so that a sharply-defined, uncoated area adjacent to a coated area may be provided with little or no chance for improper masking during the coating operation, and to provide for convenience of procedure and economy of materials.

These and further objects will be apparent from the following description, reference being had to the accompanying drawing in which:

Fig. 1 is a perspective view of composite material upon a support and illustrating the dieing out of shaped parts in accordance with a step in the procedure of the invention.

Fig. 2 is a perspective view of an article disposed upon a support and assembled for a spraying operation in accordance with the invention.

Fig. 3 is a perspective view of the article of Fig. 2 after the spraying operation and after removal of most of the masking elements.

Fig. 4 is a perspective view of a corner of one of the composite pieces each of which comprises a masking part and associated ornamental part, the two parts of the composite piece being shown as separated at the corner for the purpose of illustration.

Fig. 5 is a section taken along the line 5—5 of Fig. 4.

Fig. 6 is a perspective view of a composite masking part and toe tip piece for an article of rubber footwear.

Fig. 7 is a perspective view of an article of footwear constructed in accordance with the invention.

In accordance with the invention I avoid entirely the necessity of matching a masking element to a part after such part has been assembled with the article proper, and I avoid entirely the necessity of adjusting the matching material to bring it into correspondence with the edge of the part.

In the attainment of the objects of the invention a composite sheet material is first provided having a layer of masking material superimposed upon and lightly adhered to rubber-like or other sheet material suitable for permanent association with the article in a reinforcing or ornamental capacity. From the composite material pieces of the desired final shape for use on the article are cut or died out so that the edges of the masking material conform uniformly to the part to be protected and preferably so that the masking material and the underlying part are adhered together along the edges as a result of the simultaneous cutting, so as to assure complete protection of the underlying part. The composite piece thus formed is then mounted upon the surface of the article and secured thereto as by adhesion in its desired final disposition. The article is then subjected to a coating operation, by spraying or otherwise, to coat the adjacent area, after which the masking material may be peeled off the protected parts leaving the latter on the article in sharply-defined and contrasting appearance to the adjacent coated area.

In the form illustrated in Figs. 1 to 5, inclusive, the invention is applied to production of an ornamental mat or panel piece which may comprise a sheet backing 10 of rubber, fabric or any other suitable material. Upon the surface of the backing 10 is mounted a plurality of ornamental pieces 11, 11 and 12, 12, illustrated in Fig. 3 in the manner of a border design. The pieces 11, 11 and 12, 12 may be of rubber-like material, or of fabric or other sheet material preferably having a bottom surface of rubber or other adhesive material that may be united permanently by adhesion to the surface of the backing 10.

In sharp contrast to the ornaments 11, 11, 12, 12, the surface of the backing 10 has a coating 13 giving the surface, for example, a suede-like appearance.

In accordance with the preferred procedure of the invention, with reference to Fig. 1, a sheet 14 of material from which the parts 11, 11, 12, 12 may be cut, is assembled with a sheet 15 of masking material, the two being lightly adhered together in composite relation. The composite structure may be laid upon a suitable support 16 to facilitate cutting out composite parts corresponding in shape to the parts 11, 11, 12, 12, as by means of a cutting die 17. In Fig. 1 the operation of cutting composite parts 11a corresponding to the parts 11 is illustrated.

The composite pieces 11a, 12a are then mounted upon the sheet backing 10, for which a support 18 may be used, the composite pieces 11a, 12a being located in the desired final positions upon the backing and adhered thereto. While the underlying material 14 of the composite parts 11a, 12a may comprise tacky unvulcanized rubber composition in its bottom face, which makes possible good permanent adhesion of the composite parts to the backing, cements or other adhesives may be used to effect the attachment.

With the parts arranged in their final desired disposition, a coating is applied to the exposed face as illustrated in Fig. 2. This may be effected as by means of a spray gun 19 or by dipping, brushing or in any other suitable manner. During the spraying operation all the parts 11, 11, 12, 12, are fully protected by the superimposed masking material, without any uncertainty as to the proper matching of the masks, and further assurance of sharply-defined protection at the edges of the parts is obtained as a result of the previous cutting operation by a narrow marginal zone of firm adhesion, or actual coalescing in the case of two surfaces of unvulcanized rubber, as is indicated at 20 in Fig. 5 between the ornamental element 14 and the masking material 15.

This narrow zone 20 of juncture is subject to easy rupture after the spraying operation, permitting the masking parts to be peeled readily from the pieces 11, 11, 12, 12, as indicated at 21, 22 in Fig. 3, leaving the surfaces of the parts 11, 11, 12, 12, exposed to constitute a decoration or exposed reinforcement of the final article. The article may then be subjected to a vulcanizing operation and finishing operations as desired.

For the masking material 15 any suitable protecting material may be used such for example as sheet rubber, fabric, paper, wax or other material which may be readily removed after the coating operation. In cases where insufficient adhesion exists between the sheets 14 and 15 a light coating of readily separable adhesive material may be provided. In the case where both the sheet 14 and sheet 15 are of tacky unvulcanized material the strength of the adhesion may be reduced to a point where separation is easily possible by the application of an adhesion resisting substance 14a (Fig. 4), such for example as zinc stearate or other adhesion-resisting powder or liquid material, the purpose being to provide only sufficient adhesion to hold the mask in place during handling and coating operations and to permit ready separation of the mask from the underlying part after the coating operation.

In Figs. 6 and 7 is illustrated an application of the invention to the manufacture of rubber footwear. A rubber overshoe 30 may be provided with a main body surface 31 of suede-like appearance and a heel piece 32, a stay piece 33, and a toe tip 34 may be provided of rubber in contrasting, bright appearance simulating patent leather. The sharp lines of demarcation between the areas of contrasting appearance may be provided by the procedure of the invention as hereinabove described.

For example, with reference to the toe tip 34, this together with its masking part 35 may be died out from composite sheet material as hereinabove described with reference to Fig. 1, the composite part being cut to the desired final shape. The composite part is assembled upon the contoured upper of the overshoe, and, preferably prior to the application of the sole 36, the spraying or other coating operation is carried out to provide the suede-like surface 31. Upon peeling off the mask 35, the toe tip 34, which remains as a part of the shoe, has its uncoated surface exposed in sharply-defined contrast to the surface 31. The same procedure applies to the other parts 32 and 33 where a contrasting appearance is desired.

Variations may be made without departing from the scope of the invention as it is defined by the following claims.

I claim:

1. The method of making an article of footwear comprising rubber-like material having a portion of the surface of the upper coated adjacent to a sharply-defined uncoated portion, which method comprises providing as an independent assembly a layer of tacky extensible resilient footwear building material having a superimposed layer of extensible masking material lightly adhered thereto by virtue of the tacky surface, cutting from such assembled layers throughout the total thickness thereof a composite piece of final shape for use as footwear trim while the layers remain in the adhered relationship, providing a partially completed article of footwear having an upper, then mounting the cut-out composite piece upon the surface of said upper in adhesion therewith, then applying coating material to the surface of said upper adjacent to the composite piece, then removing the layer of masking material to expose the underlying layer of extensible resilient material as a trim surface of the article.

2. The method of making an article of footwear comprising extensible resilient material having a portion of the surface of the upper coated adjacent to a sharply-defined uncoated portion, which method comprises providing as an independent assembly a flat layer of tacky extensible resilient footwear-building material having a superimposed flat layer of extensible masking material lightly adhered thereto by virtue of the tacky surface, cutting from such assembled layers throughout the total thickness thereof a composite piece of final shape for use as footwear trim while the layers remain in the adhered relationship, providing a partially completed article of footwear having an upper, mounting the cut-out composite piece about the contoured surface of said upper in conforming adhered relation thereto, applying coating material to the surface of said upper adjacent the composite piece, and then removing the layer of masking material to expose the underlying layer of footwear-building material as a trim surface of the article.

CHARLES H. MAGURN.